UNITED STATES PATENT OFFICE.

OSCAR BIRGER CARLSON, OF MÅNSBO, AVESTA, SWEDEN, ASSIGNOR TO OSCAR FREDRIK CARLSON, OF STOCKHOLM, SWEDEN.

METHOD OF MANUFACTURING COMBUSTIBLES FOR EXPLOSIVES.

1,122,072. Specification of Letters Patent. Patented Dec. 22, 1914.

No Drawing. Application filed June 15, 1911. Serial No. 633,357.

*To all whom it may concern:*

Be it known that I, OSCAR BIRGER CARLSON, a subject of the King of Sweden, and resident of Månsbo, Avesta, in the Kingdom of Sweden, have invented certain new and useful Improvements in the Method of Manufacturing Combustibles for Explosives, of which the following is a specification.

In a previous U. S. patent application, Ser. No. 548534, I have indicated a method of manufacturing a combustible for explosives, the said method being characterized thereby that resin or nitrated resin is allowed to re-act at an increased temperature for a considerable time on nitrated organic substances. Hereby a slowly continuing chemical reaction takes place, which results in the formation of substances having quite different physical and chemical properties from those of the starting material. The present invention especially refers to the relation of said substances to nitrating acid or acid mixture, this relation being of the greatest interest from theoretical as well as from practical point of view for the manufacturing of explosives. The said substances can namely be nitrated further by means of even rather feeble nitric acid (sp. gravity for instance 1.25–1.40), even if for instance the resin was wholly nitrated, and if the nitro compound used had been produced by means of the strongest nitrating agent known, for instance a mixture of nitric acid and sulfuric acid. Thus, by reciprocal chemical re-action of two wholly nitrated substances, each of which having been produced by means of the strongest practical nitrating agents new substances are formed which are comparatively easy to nitrate further even by using a comparatively feeble nitrating agent. It has, however, not been found necessary to execute this subsequent nitrating process after having performed the reaction between resin or nitro compounds of the same on one hand and organic nitro compounds on the other, but it has on the contrary been found possible to execute this subsequent nitrating process at the same time as the chemical re-action between resin or nitrated products of the same and organic nitro compounds. From technical point of view it is evidently a considerable advantage to attain the desired effect by a single process instead of two, but on occasion it may, however, be advantageous to produce the combustible by one process and to subsequently nitrate the same by another. When using for instance nitrated resin which is porous it generally ought to be best to soak the same with a required quantity of nitric acid, and then permit the nitro compound employed to react on the same for a time sufficient for accomplishing the reaction. This subsequent nitrating reaction accounts for the fact that, introducing combustibles according to the above mentioned process invented by me, a perfectly neutral product is obtained, even if washing of the nitrated starting materials is omitted. The product thus obtained is very suitable for the production of strong explosives, particularly as they have been found to be very stable. For instance, when executing Abel's test no reaction takes place after heating to 80° cent. for half an hour.

When the product is to be used in explosives it is of the greatest importance that by the subsequent nitrating process practically no raising of the fusing point and no alteration of the viscosity are caused, the product being in this respect quite as suitable for the production of plastic explosives as the combustible indicated in the specification of my above mentioned previous U. S. patent application.

When starting from highly nitrated organic substances as for instance highly nitrated resin, and when driving the subsequent nitrating process sufficiently far the product obtained may be used as an explosive without any addition whatever of oxidizing salt, but for most purposes such an explosive is too expensive. In such cases one employs cheaper, lower nitrated bodies and mixes the product with a suitable quantity of oxidizing salt. On account of the viscous character of the product the explosive produced in this way will remain plastic, even if the mixture contains as much as 80-85 per cent. of a crystalline, oxidizing salt.

From executed experiments it seems to result that the new nitro groups arisen from the subsequent nitrating process are bound to the part of the product issuing from the resin or nitrated resin. Though it seems to be possible to drive the subsequent nitrating yet higher the total amount of nitrogen has, by the working process generally used by me, corresponded to a mixture of nitrated resin with about 7.5% N. and the nitro body employed. (As has been stated above it is no ordinary mixture, but the mixed parts are believed to have chemically reacted upon each other). This rather constant amount of nitrogen found by calculation seems to indicate that only the group arising from the resin and not the nitro body employed takes part in the subsequent nitrating reaction. If subsequent nitrating of the nitro body contained in the mixture should take place it is not possible to understand wherefore so high an amount of nitrogen can not be obtained, if one starts from for instance mononitro-benzene or from trinitro-benzene.

From the above mentioned fact it seems to be evident that it has been possible to nitrate the resin further after it has reacted on or during its reaction with a nitrated organic substance. The difficulty in nitrating resin is to prevent the oxidation which occurs very easily. This is why the products of oxidation of resin have been known for a long time, while it has been considered to be impossible to nitrate resin. In Beilstein's handbook of organic chemistry it is stated that when treating resin with nitric acid the result will only be products of oxidation free from nitrogen, while the products of nitrating seem to be unknown to him. However, if some precautions are taken resin can be nitrated so that a total amount of nitrogen of a little more than 5% is obtained. If one tries to drive the nitrating reaction further oxidation will immediately take place. After or during the reaction with other nitro compounds the resin is, however, as will be clear from the foregoing, more resistant to oxidation and, therefore, it binds a higher amount of nitrogen than by the ordinary nitrating process.

The reaction between resin, nitrated or not, and a nitrated organic body, is as follows: In resin, as well as in most terpenes, double bindings can easily be shown. If, for instance, a nitrated organic body with the formula

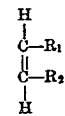

shall react with resin, the constitution of which, whether it is nitrated or not, can be expressed with the formula

the reaction is expressed as follows:

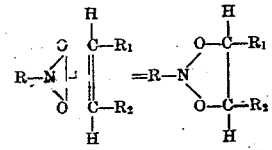

If the nitrogen were bound in the organic nitrated body in any other way, analogous formulæ can be advanced.

From the above example it will be evident that the reaction on which the present method is based is independent of whether the resin is nitrated or not. The case is, of course, such that in unnitrated resin there may be more double bindings than in the nitrated resin, and that some double binding is unbound by the nitrating process. How this case in fact is, is not easy to decide; however, it can be proved that also in the nitrated resin, principally in the form of nitrated abietinic acid, there remains at least some (probably two) of the original double bindings. The formula of reaction will prove that the only condition for the possibility of executing the reaction is the presence of at least one double binding in the resinous body.

Finally, some examples may be cited:

1. 3 kg. of trinitrotoluene containing 18.5% of nitrogen were allowed to react at a temperature of 70° C., upon 1 kg. of nitrated resin with 5.2% of nitrogen, in the presence of 0.3 liter of nitric acid of 1.35 sp. gravity during 8 hours. A product containing about 16% of nitrogen was obtained. This product itself may be used as an explosive.

2. 37.5 kg. of nitrated resin containing 3.5% of nitrogen were in the presence of 10.3 liters of nitric acid of 1.35 sp. gravity allowed to react upon 62.5 kg. of nitrated toluene containing 12% of nitrogen at a temperature of 70° C. After 15 hours a product containing 10.5% of nitrogen was obtained. Hereby 98% of the nitrogen of the nitric acid employed were recovered in the product. If 21 kg. of this product are mixed with 79 kg. of ammonium perchlorate a plastic explosive with superior qualities is obtained.

The specific temperatures, times and specific gravities in the foregoing examples are not absolutely required to execute the process, but are given as advantageous working examples.

The following examples are given to show first, that other nitro compounds than aromatic ones could be used, as, for instance, nitro starch, and hence the invention is not to be limited to aromatic compounds, and, second, to give an example with common (unnitrated) resin.

3. 37.5 kg. of nitrated resin with 3.5% of nitrogen are allowed to react, in the presence of 120 l of nitric acid specific gravity 1.32 at 75°, with 58 kg. of nitrated toluol with 12% of nitrogen and 4.5 kg. of nitrocellulose with 11½% N. One obtains a product with 10.4% N. of which 21.5 parts with 79.5 parts of ammonium perchlorate provide a plastic explosive.

4. 34 kg. of unnitrated resin and 5 kg. of rye-meal are allowed, in the presence of 45 l of nitric acid specific gravity 1.38 at 70°, to act upon 58 kg. of nitrated benzol with 14% of N. First nitrated starch is obtained and one gets 100 kg. of combustible with 11.3 of N., which in the proportion 21:79 gives a plastic explosive.

5. 40 kg. of nitrated resin containing 3.5% of nitrogen were allowed to react with 60 kg. of nitrated toluene containing 12% of nitrogen and with 4.5 kg. of nitrocellulose containing 11.5% of nitrogen at a moderately increased temperature. The product obtained was further heated to 75° C. together with 120 litres of nitric acid having a specific gravity of 1.32. The product of reaction obtained contained 10.4% of nitrogen and gives, in the ratio of 20.5; 79.5 a plastic explosive.

From the above examples Nos. 3 and 5, it will be clear that the same result is obtained whether the nitrating agent is present during the reaction between the nitrated resin and the nitrated organic body or if it is added after such reaction. For practical reasons, however, the method according to example 3 ought to be preferred.

In the foregoing the nitrating of the product of reaction has been referred to as a subsequent nitrating operation even in the case that the nitrating agent is present during the principal reaction. This is due to the fact that in all cases the reaction takes place in such a manner that the combustible is first formed and then nitrated, even if the nitrating agent is present during the reaction between resin or nitrated resin and organic nitro compounds.

What I claim is:

1. In a method of producing combustibles for explosives, allowing a resinous substance to react upon an organic nitro compound at a temperature above the ordinary atmospheric temperature and for a time sufficient to complete the reaction and nitrating the product of reaction.

2. In a method of producing combustibles for explosives, allowing nitrated resin to react upon an organic nitro compound at a temperature above the ordinary atmospheric temperature and for a time sufficient to complete the reaction and nitrating the product of reaction.

3. In a method of producing combustibles for explosives, allowing nitrated resin to react upon an organic nitro compound at a temperature above the ordinary atmospheric temperature and for a time sufficient to complete the reaction in the presence of a nitrating agent for nitrating the product of reaction.

4. In a method of producing combustibles for explosives, allowing nitrated resin to react upon an organic nitro compound at a temperature above the ordinary atmospheric temperature and for a time sufficient to complete the reaction, nitrating the product of reaction and adding a solid oxidizing salt to the product obtained.

In witness whereof, I have hereunto signed my name in the presence of two subscribing witnesses.

OSCAR BIRGER CARLSON.

Witnesses:
AXEL EHRNER,
HEDWIG MELINDER.